N. D. LEVIN.
GEAR WHEEL.
APPLICATION FILED DEC. 17, 1906.
928,676.
Patented July 20, 1909.
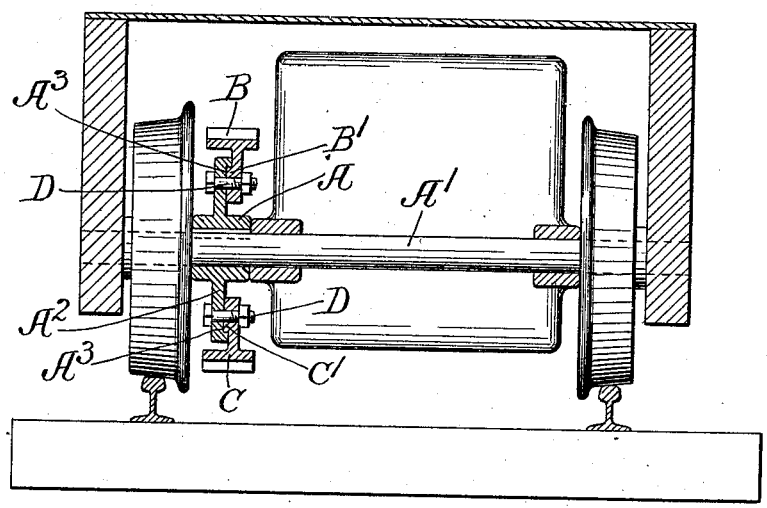
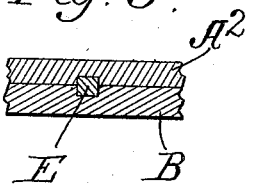
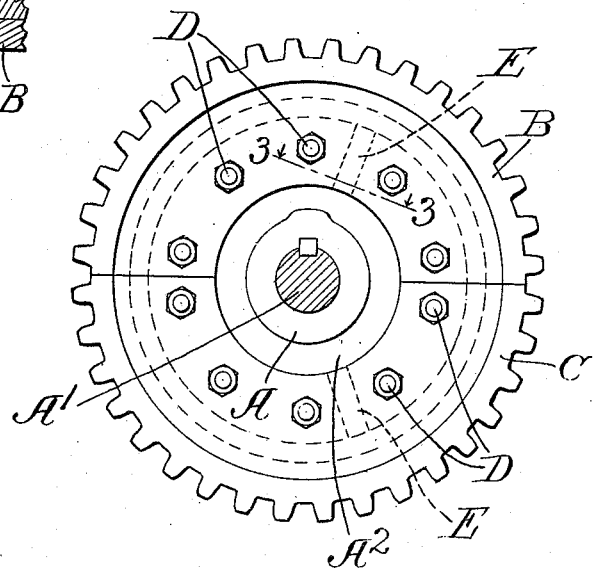
Witnesses,
Edward T. Wray.
Edna K. Reynolds.
Inventor.
Nils D. Levin
by Parker & Carter
Attorneys.

UNITED STATES PATENT OFFICE.

NILS DAVID LEVIN, OF CHICAGO, ILLINOIS, ASSIGNOR TO GOODMAN MANUFACTURING COMPANY, OF CHICAGO, ILLINOIS, A CORPORATION OF ILLINOIS.

GEAR-WHEEL.

No. 928,676.  Specification of Letters Patent.  Patented July 20, 1909.

Application filed December 17, 1906. Serial No. 348,350.

*To all whom it may concern:*

Be it known that I, NILS DAVID LEVIN, a citizen of the United States, residing at Chicago, in the county of Cook and State of Illinois, have invented a certain new and useful Improvement in Gear-Wheels, of which the following is a specification.

This invention relates to gear wheels, and has for its object to provide a new and improved device of this description.

The invention is illustrated in the accompanying drawings, wherein—

Figure 1 is a view showing a gear embodying the invention; Fig. 2 is a side elevation of said gear; Fig. 3 is a sectional view taken on line 3—3 of Fig. 2.

Like letters refer to like parts throughout the several figures.

I have illustrated the device used in connection with a locomotive for mines and the like. The spur gear for locomotives as ordinarily used, is under great strain and wears out more or less rapidly, and in order to replace it on the axle without removing one of the wheels it is necessary to split such gear. This construction is unsatisfactory and it is exceedingly difficult to keep the bolts, which hold the two halves of the spur gear, tight and if the bolts get loose the gear will break through the key seat. In view of the position and limited number of bolts that can be used on a split gear and the strain upon them they are liable to be stretched, broken or otherwise injured.

One of the objects of my invention is to overcome these difficulties.

As illustrated in the drawings, this gear consists of a solid hub A pressed and keyed on the axle $A^1$ so as to be a permanent part thereof. The rim of the gear is split and is divided into two or more parts, B and C. This split rim can then be easily attached to or detached from the hub A. As herein shown, the hub A is provided with a projecting flange or web $A^2$. This web is provided with an engaging part or shoulder $A^3$ and the rim portions B and C are provided with engaging parts or projections $B^1$, $C^1$ on the web thereof which engage the engaging part or shoulder $A^3$. These engaging parts $B^1$ and $A^3$ prevent the rim portions from moving away from the axle. The rim portions may then be fastened to the web by means of the bolts D. Some means is provided for taking the torsional strain from the bolts. This may be done in any desired manner. For purposes of illustration I have shown this torsional strain as being taken up by the radial keys E which fit in grooves in the webs of the hub and rim portions as shown, for example, in Fig. 3. By using some such device as the key E the torsional strain is taken from the bolts and it is thus unnecessary to make them an exact fit, as under the ordinary conditions of commercial operation this would be expensive. It will be seen that by this arrangement a number of bolts can be used, and that they can be distributed so as to best take care of the strain. When the bolts or engaging projections $B^1$ and $A^3$ and the keys E are used it will be seen that the function of the bolts is simply to hold the parts together. If these are omitted all of the strains will come upon the bolts. It will thus be seen that by this construction the gear can be easily removed when it becomes worn, and the gear renewed by simply fastening new rim sections to the web. It will be seen that in this construction the strains are all taken up by the solid metal, and consequently a rigid construction is secured. It will further be seen that the rim is divided into a plurality of sections which are connected to the hub independent of each other.

I claim:

1. A gear comprising a hub portion, a plurality of rim portions, each rim portion removably fastened to the hub portion, said hub portion and rim portion separated by a space in the plane of the hub portion and radial keys engaging said rim and hub portions so as to lock them together.

2. A gear comprising a hub portion provided with a web, a plurality of rim portions provided with webs and gear teeth, each rim portion independently and removably fastened to the hub portion, and means between said rim and hub portions and engaging the webs thereof to take the torsional strain on the gear.

3. A gear comprising an integral hub portion, a web associated therewith, a plurality of rim portions connected with said web, and provided with webs, engaging parts on the web of the hub and rim portion which prevent the rim portion from moving away from the hub, and means in the plane of the webs of the hub and rim portions for taking up the torsional strain.

4. A gear comprising an integral hub portion, a web associated therewith, a plurality of rim portions connected with said web, an engaging part on the web and on each rim portion which prevents the rim portion from moving away from the hub, radial engaging parts on the web and the rim sections which hold the sections and the web against relative rotation, and a series of bolts passing through the web and rim sections.

5. The combination with a revoluble shaft of a gear wheel having an integral hub portion provided with a web permanently fastened to the shaft obstructing portions on said shaft on each side of said hub, a plurality of rim portions provided with webs and gear teeth, two connections between the webs of the hub and rim portions, one extending entirely through both webs and the other partially through said webs.

6. A gear wheel comprising a hub portion, a web integral therewith, a plurality of rim portions removably fastened to said web and enlarged at their periphery to provide teeth, there being a space between the web and the teeth in the plane of the web, and a space between the rim portions and the hub and radial connecting pieces between the hub and rim portions.

NILS DAVID LEVIN.

Witnesses:
EDWARD T. WRAY,
DONALD M. CARTER.